United States Patent
Lefevre et al.

(10) Patent No.: US 7,305,503 B2
(45) Date of Patent: Dec. 4, 2007

(54) METHOD AND APPARATUS FOR CONTROLLING AN EXTERNAL DEVICE USING AUTO-PLAY/AUTO-PAUSE FUNCTIONS

(75) Inventors: Chad Andrew Lefevre, Indianapolis, IN (US); Eric Stephen Carlsgaard, Zionsville, IN (US); Mark Alan Logan, Beech Grove, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 113 days.

(21) Appl. No.: 10/554,898

(22) PCT Filed: May 4, 2004

(86) PCT No.: PCT/US2004/013860

§ 371 (c)(1),
(2), (4) Date: Oct. 28, 2005

(87) PCT Pub. No.: WO2004/100002

PCT Pub. Date: Nov. 18, 2004

(65) Prior Publication Data
US 2006/0294265 A1 Dec. 28, 2006

Related U.S. Application Data

(60) Provisional application No. 60/467,995, filed on May 5, 2003.

(51) Int. Cl.
*G06F 13/00* (2006.01)
(52) U.S. Cl. .......................... 710/104; 710/15; 710/19; 710/302; 710/313
(58) Field of Classification Search ............ 710/8, 710/15, 19, 104, 302, 313
See application file for complete search history.

(56) References Cited

U.S. PATENT DOCUMENTS

| | | | |
|---|---|---|---|
| 6,732,262 B1 * | 5/2004 | Sakai | 713/1 |
| 6,801,957 B1 * | 10/2004 | Sadanaka et al. | 710/16 |
| 6,912,596 B2 * | 6/2005 | Skidmore et al. | 710/1 |
| 7,149,785 B1 * | 12/2006 | Nakamura | 709/208 |

OTHER PUBLICATIONS

Anderson, Don; FireWire System Architecture, Second Edition IEEE 1394a; MindShare Inc.; 1999; pp. 267-269 and 273-278.*
IEEE Standard for a High Performance Serial Bus—Amendment 1 (IEEE Std 1394a-2000); Institute of Electrical and Electronics Engineers, Inc.; Mar. 30, 2000; pp. 21-23 and 91-97.*
IEEE Microprocessor and Microcomputer Standards committee P1394a Draft Standard for high Performance Serial Bus XP002304835, 1999.
Energy Conservation Working Group: 1394 Trade Association Power Specification Part 2: Suspend/Resume Implementation Guidelines XP002156050, Oct. 5, 1999.
Printer Working Group C "PWG-C proposal to the 1394 Trade Association AV/CManaged Asynchronous Serial Bus Connections" XP002215801, Jul. 7, 1998.
International Search Report, Jun. 12, 2004.

* cited by examiner

*Primary Examiner*—Glenn A. Auve
(74) *Attorney, Agent, or Firm*—Joseph J. LAks; Robert D. Shedd; Reitseng Lin

(57) ABSTRACT

An external device such as a digital recording/reproduction device may be controlled via a digital data bus using auto-play and/or auto-pause functions. According to an exemplary embodiment, a method for controlling an external device includes detecting initiation of one of a disconnection from the external device and a connection to the external device, providing a pause command signal to the external device via a digital data bus if the initiation of the disconnection from the external device is detected, and providing a play command signal to the external device via the digital data bus if the initiation of the connection to the external device is detected.

18 Claims, 3 Drawing Sheets

METHOD AND APPARATUS FOR CONTROLLING AN EXTERNAL DEVICE USING AUTO-PLAY/AUTO-PAUSE FUNCTIONS

CROSS REFERENCE TO RELATED APPLICATION

This application claims the benefit, under 35 U.S.C. § 365 of International Application PCT/US04/13860, filed May 4, 2004 which was published in accordance with PCT Article 21(2) on Nov. 18, 2004 in English and which claims the benefit of United States provisional patent application No. 60/467,995 filed May 5, 2003.

BACKGROUND OF THE INVENTION

1. Field of the Invention

The present invention generally relates to a technique for controlling an external device, and more particularly, to a method and apparatus for controlling an external device such as a digital recording/reproduction device via a digital data bus by using auto-play and/or auto-pause functions.

2. Background Information

A digital data bus can be utilized for transmitting digital data in a network among digital devices, such as television signal receivers, personal computers (PCs), display devices, digital video cassette recorders (DVCRs), digital versatile disk (DVD) players, audio/video hard disk drives (AVH-DDs), direct broadcast satellite (DBS) receivers, home control devices (e.g., security systems, temperature control devices, etc.), and/or other devices. A digital data bus is typically compliant with a particular standard or specification. An example of a wired digital bus standard includes the Institute for Electrical and Electronic Engineers (IEEE) 1394 High Performance Serial Bus standard, which is well known in the art. Wireless digital bus standards, such as Hiperlan2, are also known in the art.

In a digital bus network, certain problems may occur when one device, such as a television signal receiver, disconnects from an external device in the network, such as an AVHDD, and later re-establishes the connection with the external device. Such a disconnection and connection in a digital bus network may involve a specific signal protocol (e.g., disconnect request—disconnect response, connect request—connect response, etc.), and may occur when a user causes a network device to switch from one input to another input. For example, problems may occur in that when the connection with the external device is re-established, the external device may restart playing the track it was playing at the time of disconnection from the beginning. It is likewise problematic if the external device continues to play after the disconnection is made. In particular, both of the foregoing situations are generally undesirable since users are unable to continue playing a track from its then-current point at the time of disconnection, and must either advance and or reverse within the track to find the exact point where they left off. This process can be imprecise, inconvenient, time consuming and frustrating for users.

One approach for addressing the foregoing problems is for devices to store and maintain a list of all other network devices that indicates the last state such network devices are in at the time of disconnection. This approach, however, is not optimal since it may be rather complex to implement, and also consumes valuable memory capacity of a device. Another approach for addressing the foregoing problems is to maintain a connection with a network device when switching away from that device, This approach is likewise not optimal since maintaining a connection with a device in a digital bus network may lead that device to falsely believe that it has an avenue to communicate with the other connected device.

Other problems may also occur in a digital bus network as the result of a power interruption (e.g., device turned off, device unplugged, etc.). For example, if a device is connected to another network device at the time of a power interruption, when power to the device is restored, the device may be automatically switched to a non-network input (e.g., antenna input), and away from the network device. This may be inconvenient in that it requires users to manually switch back to the network device.

The present invention addresses the foregoing and/or other problems by providing a method and apparatus for controlling an external device such as a digital. recording/ reproduction device via a digital data bus using auto-play and or auto-pause functions.

SUMMARY OF THE INVENTION

In accordance with an aspect of the present invention, a method for controlling an external device is disclosed. According to an exemplary embodiment, the method comprises steps of detecting initiation of one of a disconnection from the external device and a connection to the external device, providing a first command signal to interrupt operation of the external device via a data bus if the initiation of the disconnection from the external device is detected, and providing a second command signal to resume the operation of the external device via the data bus if the initiation of the connection to the external device is detected.

In accordance with another aspect of the present invention, an apparatus is disclosed. According to an exemplary embodiment, the apparatus comprises input/output means for connecting the apparatus to an external device via a data bus. Processing means detect initiation of one of a disconnection from the external device and a connection to the external device. The input/output means outputs a first command signal to interrupt operation of the external device via the data bus if the processing means detects the initiation of the disconnection from the external device, and outputs a second command signal to resume the operation of the external device via the data bus if the processing means detects the initiation of the connection to the external device.

In accordance with still another aspect of the present invention, a television signal receiver is disclosed. According to an exemplary embodiment, the television signal receiver comprises an input/output terminal operative to connect the television signal receiver to an external device via a data bus. A processor is operative to detect initiation of one of a disconnection from the external device and a connection to the external device. The input/output terminal outputs a first command signal to interrupt operation of the external device via the data bus if the processor detects the initiation of the disconnection from the external device, and outputs a second command signal to resume the operation of the external device via the data bus if the processor detects the initiation of the connection to the external device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Figure 1:
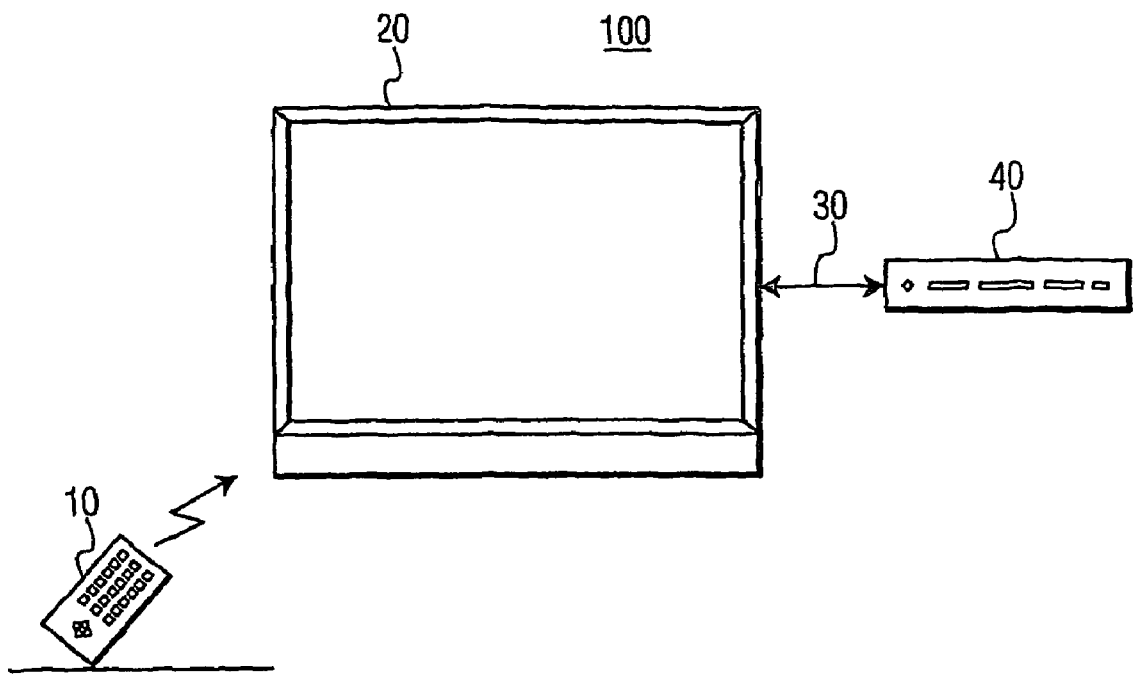
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, controlling means such as apparatus 20, digital bus means such as digital data bus 30, and controlled means such as external device 40.

User input device 10 is operative to receive user inputs that control the operation of apparatus 20 and/or external device 40. According to an exemplary embodiment, user input device 10 comprises a plurality of keys and transmits command signals such as wireless infrared (IR) and/or radio frequency (RF) signals in accordance with a predetermined control protocol to apparatus 20 responsive to user depression of its keys. User input device 10 may for example be embodied as a hand-held remote control device, wired and/or wireless keyboard, or other user input device.

Apparatus 20 is operative to receive signals including audio, video and/or data signals in analog and/or digital format from one or more signal sources such as terrestrial, cable, satellite, internet and or other signal sources. Apparatus 20 is also operative to process received signals to generate digital signals, and to provide such digital signals, as well as digital command signals, to one or more devices including external device 40 via digital data bus 30. Apparatus 20 may be controlled by a user responsive to inputs via user input device 10, and such inputs may also be used to control external device 40. According to an exemplary embodiment, apparatus 20 may be embodied as a television signal receiver or other device that is compliant with the bus standard (e.g., IEEE-1394, Hiperlan2, etc.) of digital data bus 30. As will be described later herein, apparatus 20 provides auto-play and auto-pause functions which control external device 40.

Digital data bus 30 is operative to transmit digital signals between devices including apparatus 20 and external device 40. According to an exemplary embodiment, digital data bus 30 may be embodied as a wired and/or wireless digital bus that is compliant with a given bus standard or specification. For example, digital data bus 30 may be embodied as a wired digital bus such as an IEEE-1394 bus and/or a wireless digital bus, such as a Hiperlan2 bus.

External device 40 is operative to receive signals including audio, video, data and/or command signals from apparatus 20, and also to provide signals to apparatus 20 via digital data bus 30. According to an exemplary embodiment, external device 40 may be embodied as any device that is compliant with the bus standard (e.g., IEEE-1394, Hiperlan2, etc.) of digital data bus 30 which accepts a play command and/or a pause command. For example, external device 40 may be embodied as a digital recording/reproduction device such as an AVHDD, DVCR, or other device.

Figure 2:
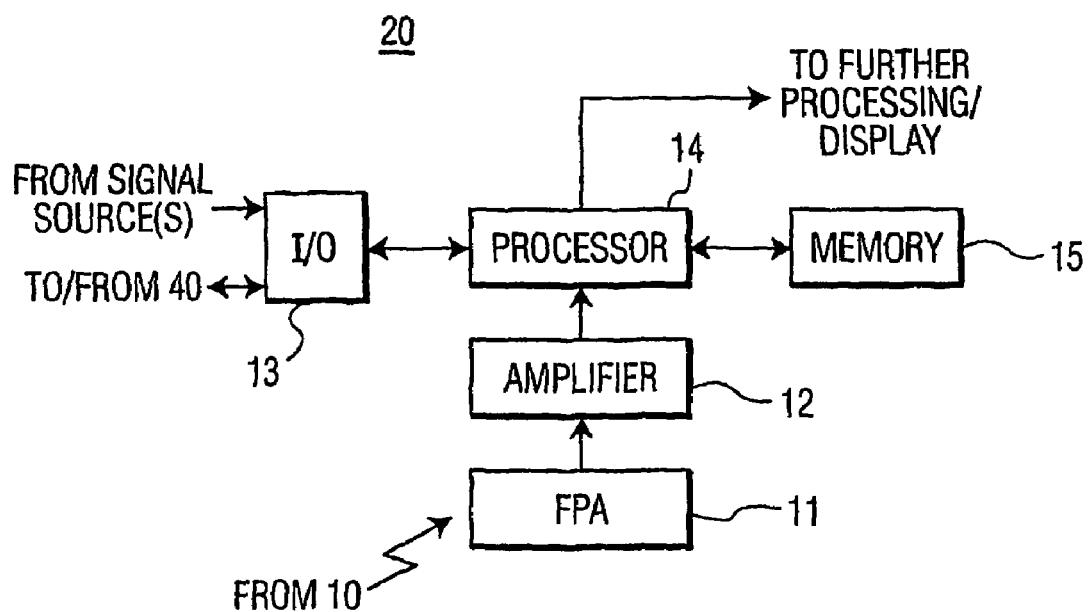
FIG. 2 is a block diagram providing further details of the apparatus of FIG. 1 according to an exemplary embodiment of the present invention.

Referring to FIG. 2, a block diagram providing further details of apparatus 20 of FIG. 1 according to an exemplary embodiment of the present invention is shown. Apparatus 20 of FIG. 2 comprises front panel means such as front panel assembly (FPA) 11, amplifying means such as amplifier 12, and input/output (I/O) means such as I/O block 13, processing means such as processor 14, and memory means such as memory 15. Some of the foregoing elements of FIG. 2 may be embodied using integrated circuits (ICs), and some elements may for example be included on one or more ICs. For clarity of description, certain conventional elements associated with apparatus 20 such as certain control signals, power signals and or other elements may not be shown in FIG. 2.

FPA 11 is operative to receive user inputs from user input device 10, and to output signals corresponding to the user inputs to amplifier 12. According to an exemplary embodiment, FPA 11 receives wireless signals, such as IR and/or RF signals, from remote control device 10 and generates corresponding signals, which are output to amplifier 12. Amplifier 12 is operative to amplify the signals provided from FPA 11 for output to processor 14.

I/O block 13 is operative to perform I/O functions of apparatus 20. According to an exemplary embodiment, I/O block 13 is operative to receive signals including audio, video and or data signals in analog and/or digital format from one or more signal sources such as terrestrial, cable, satellite, internet and or other signal sources. I/O block 13 is also operative to output digital signals to and receive digital signals from one or more other devices including external device 40 via digital data bus 30. According to an exemplary embodiment, I/O block 13 includes a plurality of input and/or output terminals including at least one bi-directional terminal such as the one connected to digital data bus 30. As referred to herein, an input and/or output terminal of I/O block 13 may be simply referred to as an "input" of apparatus 20. As will be described later herein, a user input via user input device 10 may cause apparatus 20 to switch from one input to another input via I/O block 13.

Processor 14 is operative to perform various signal processing and control functions of apparatus 20. According to an exemplary embodiment, processor 14 processes signals provided from I/O block 13 by performing functions including tuning, demodulation, forward error correction, and transport processing functions to thereby generate digital signals. The digital signals produced from such processing functions may be provided for further processing (e.g., MPEG decoding, etc.) and display, and/or may be provided to one or more other devices including external device 40 via digital data bus 30.

Processor 14 is also operative to detect user inputs provided via user input device 10, including inputs, which initiate a disconnection from, and connection to devices on digital data bus 30 such as external device 40. Processor 14 may output one or more control signals, which cause apparatus 20 to switch from one input to another Input via I/O block 13. Processor 14 also enables the generation and output of various digital command signals, such as play and pause command signals, to external device 40 via digital data bus 30. According to an exemplary embodiment, such command signals may be audio video/control (AV/C) protocol signals as defined by the 1394 Trade Association, Grapevine, Tex., USA, or signals of another protocol. As will be described later herein, the play and pause command signals may be used to control external device 40 in accordance with auto-play and auto-pause functions of apparatus 20.

Memory 15 is operative to perform data storage functions of apparatus 20. According to an exemplary embodiment, memory 15 stores data such as software code, command data and user setup data, which enable processor 14 to perform one or more processing, and/or control functions.

Figure 3:
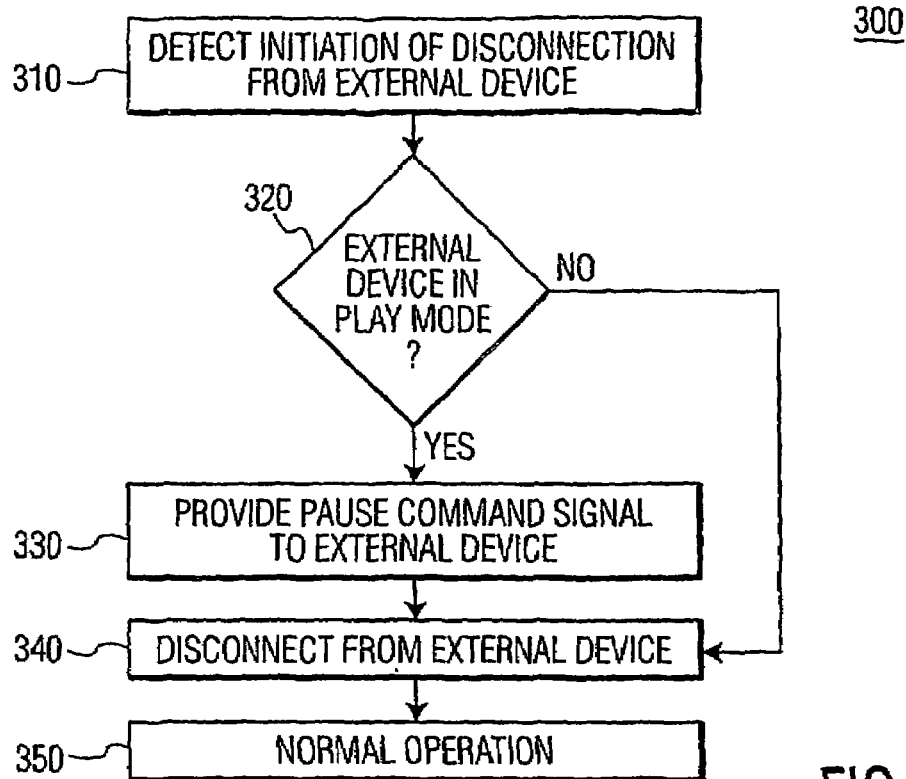
FIG. 3 is a flowchart illustrating exemplary steps according to one aspect of the present invention.

Referring now to FIG. 3, a flowchart 300 illustrating exemplary steps according to one aspect of the present invention is shown. In particular, the steps of FIG. 3 illustrate how the auto-play function may be used for device control according to an exemplary embodiment of the present invention. For purposes of example and explanation, the steps of FIG. 3 will be described with reference to the elements shown in environment 100 of FIG. 1. The steps of FIG. 3 are merely exemplary, and are not intended to limit the present invention in any manner.

At step 310, apparatus 20 detects the initiation of a disconnection process from external device 40. According to an exemplary embodiment, processor 14 detects the initiation of the disconnection process from external device 40 at step 310 responsive to a user input via user input device 10 which switches the current input of apparatus 20 away from external device 40. For example, a user may provide an input, which causes apparatus 20 to switch its input to a device that is not connected to digital data bus 30.

At step 320, apparatus 20 determines whether external device 40 is in the play mode. According to an exemplary embodiment, apparatus 20 provides a digital command signal to external device 40 via digital data bus 30 under the control of processor 14 at step 320, which enables apparatus 20 to read operating mode data indicating the current operating mode of external device 40, and thereby determine whether external device 40 is in the play mode. For example, with AV/C protocol, a READ INFO BLOCK command signal may be provided to external device 40 to thereby read such operating mode data.

If the determination at step 320 is positive, process flow advances to step 330 where apparatus 20 provides a pause command signal to interrupt operation of external device 40 via digital data bus 30 under the control of processor 14. According to an exemplary embodiment, the pause command signal provided at step 330 may be implemented using an AV/C protocol PLAY command with a speed variation, although a different signal protocol could also be used.

From step 330, and also when the determination at step 320 is negative, process flow advances to step 340 where apparatus 20 disconnects from external device 40 under the control of processor 14. According to an exemplary embodiment, the disconnection from external device 40 at step 340 may Involve a specific signal protocol (e.g., disconnect request—disconnect response, etc.) associated with digital data bus 30. For example, the disconnection from external device 40 at step 340 may be performed in accordance with the asynchronous and isochronous characteristics prescribed by the IEEE-1394 standard. From step 340, process flow advances to step 350 where apparatus 20 continues with normal operation.

Figure 4:
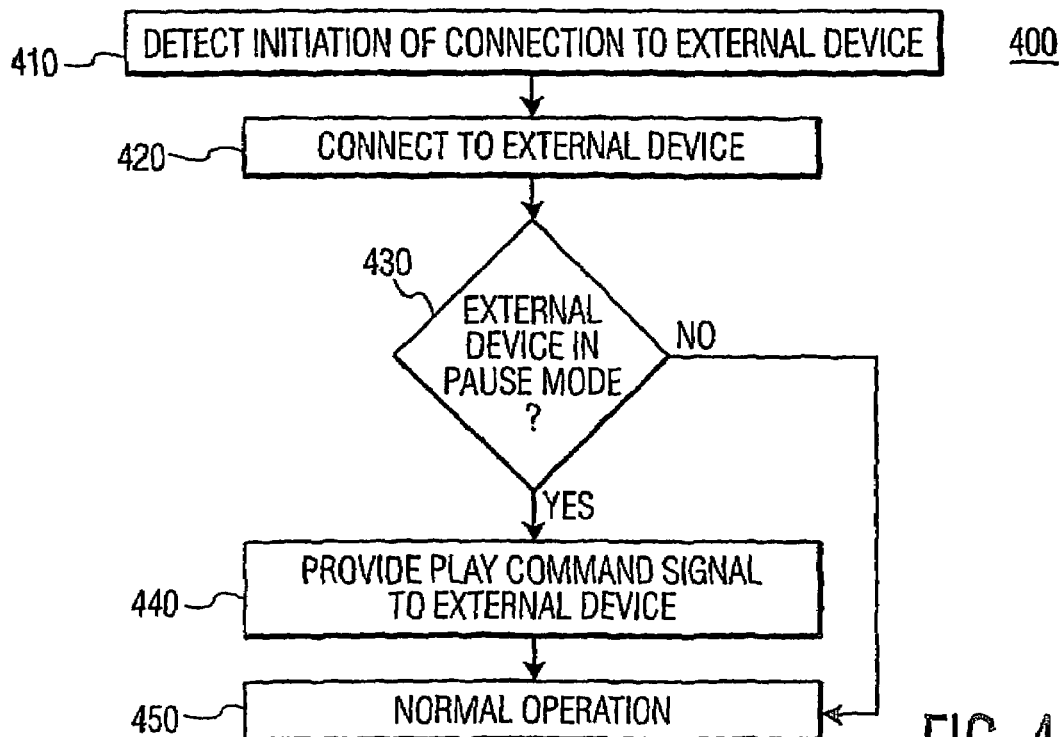
FIG. 4 is a flowchart illustrating exemplary steps according to another aspect of the present invention.

Referring now to FIG. 4, a flowchart 400 illustrating exemplary steps according to another aspect of the present invention is shown. In particular, the steps of FIG. 4 illustrate how the auto-pause function may be used for device control according to an exemplary embodiment of the present invention. For purposes of example and explanation, the steps of FIG. 4 will also be described with reference to the elements shown in environment 100 of FIG. 1. The steps of FIG. 4 are merely exemplary, and are not intended to limit the present invention in any manner.

At step 410, apparatus 20 detects the initiation of a connection process to external device 40. According to an exemplary embodiment, processor 14 detects the initiation of the connection process to external device 40 at step 410 responsive to a user input via user input device 10 which switches the current Input of apparatus 20 to external device 40. For example, a user may provide an input, which causes apparatus 20 to switch its input to external device 40 and away from a device that is not connected to digital data bus 30.

At step 420, apparatus 20 connects to external device 40 under the control of processor 14. According to an exemplary embodiment, the connection to external device 40 at step 420 may involve a specific signal protocol (e.g., connect request—connect response, etc.) associated with digital data bus 30. For example, the connection to external device 40 at step 420 may be performed in accordance with the asynchronous and isochronous characteristics prescribed by the IEEE-1394 standard.

At step 430, apparatus 20 determines whether external device 40 is in the pause mode. According to an exemplary embodiment, apparatus 20 provides a digital command signal to external device 40 via digital data bus 30 under the control of processor 14 at step 430, which enables apparatus 20 to read operating mode data indicating the current operating mode of external device 40, and thereby determine whether external device 40 is in the pause mode. For example, with AV/C protocol, a READ INFO BLOCK command signal may be provided to external device 40 to thereby read such operating mode data.

If the determination at step 430 is negative, process flow advances to step 450 where apparatus 20 continues with normal operation. Alternatively, if the determination at step 430 is positive, process flow advances to step 440 where apparatus 20 provides a play command signal to resume the operation of external device 40 via digital data bus 30 under the control of processor 14. According to an exemplary embodiment, the play command signal provided at step 440 may be an AV/C protocol PLAY command signal although a different signal protocol could also be used. From step 440, process flow advances to step 450 where apparatus 20 continues with normal operation.

Figure 5:
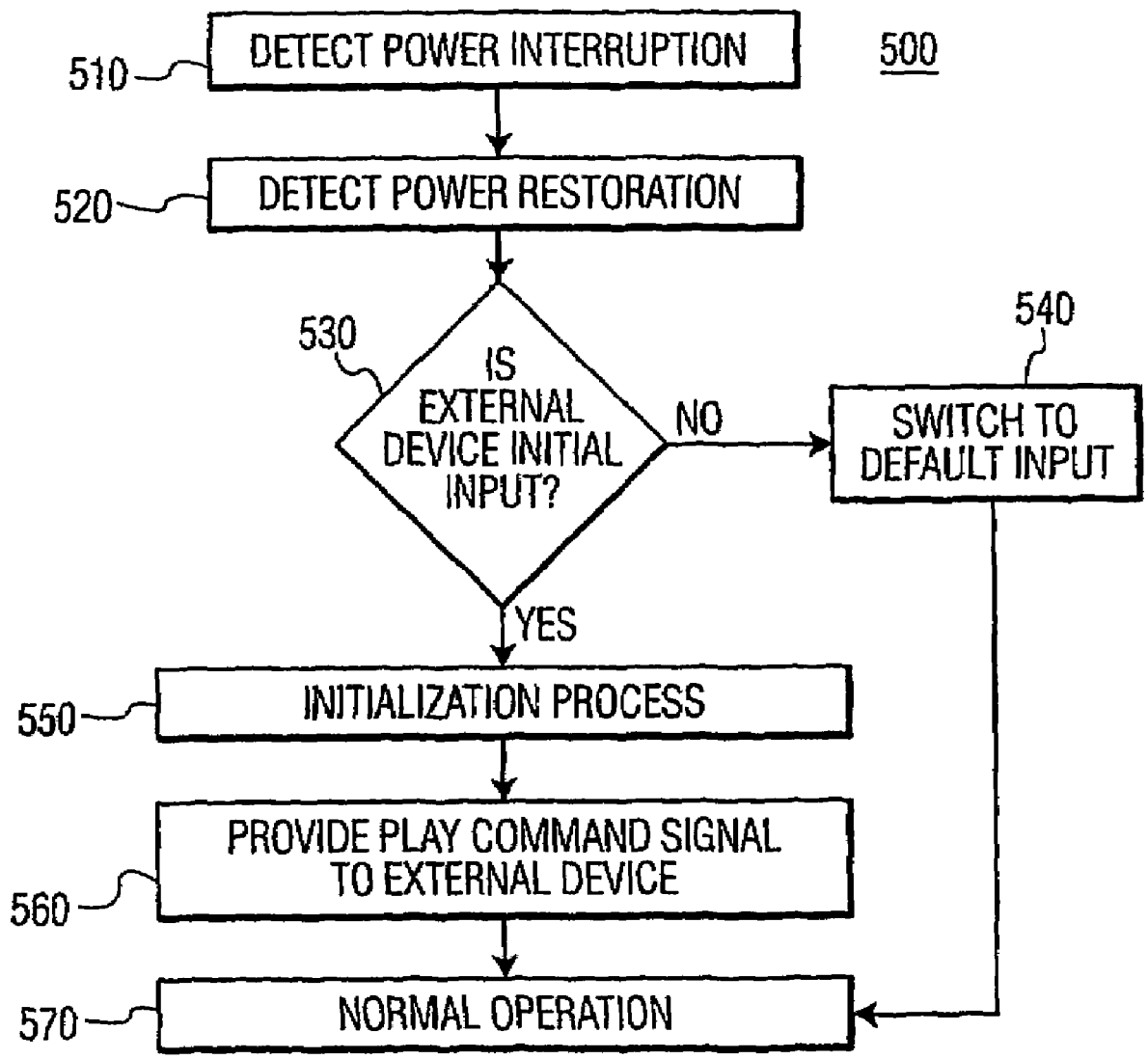
FIG. 5 is a flowchart illustrating exemplary steps according to still another aspect of the present invention.

Referring now to FIG. 5, a flowchart 500 illustrating exemplary steps according to still another aspect of the present invention is shown. In particular, the steps of FIG. 5 illustrate how the auto-play function may be used for device control according to another exemplary embodiment of the present invention. For purposes of example and explanation, the steps of FIG. 5 will also be described with reference to the elements shown in environment 100 of FIG. 1. The steps of FIG. 5 are merely exemplary, and are not intended to limit the present invention in any manner.

At step 510, apparatus 20 detects a power interruption. According to one exemplary embodiment, processor 14 detects the power interruption at step 510 responsive to a user input via user input device 10 which switches apparatus 20 from an on state to an off/standby state. During the off/standby state, certain elements of apparatus 20 may still receive power, and apparatus 20 may be switched back to the on state responsive to another user input via user input device 10. According to another exemplary embodiment, processor 14 detects the power interruption at step 510 responsive to a complete removal of power from apparatus 20. This type of power interruption may occur for example if apparatus 20 is unplugged from its power source (e.g., wall outlet), or a power outage occurs as the result of conditions such as adverse weather conditions, utility company problem, etc.

At step 520, apparatus 20 detects a restoration of power. According to one exemplary embodiment, processor 14 detects the restoration of power at step 520 responsive to a user input via user input device 10 which switches apparatus 20 from the off/standby state to the on state. According to another exemplary embodiment, processor 14 detects the restoration of power at step 520 responsive to apparatus 20 being plugged back in to its power source, or when a power outage attributable to conditions such as adverse weather conditions, utility company problems, etc. is corrected.

At step 530, apparatus 20 determines whether external device 40 is selected as its initial input. According to an exemplary embodiment, apparatus 20 includes an initial input selection setting as part of its user setup process, which allows users to select a particular input of apparatus 20 that is automatically switched to whenever power is applied to apparatus 20. Accordingly, at step 530, processor 14 checks the current user setup data in memory 15 to determine whether the user has selected external device 40 as its initial input.

If the determination at step 530 is negative, process flow advances to step 540 where apparatus 20 switches to its default input (e.g., an antenna input, etc.) under the control of processor 14. From step 540, process flow advances to step 570 where apparatus 20 continues with normal operation. Alternatively, if the determination at step 530 is positive, process flow advances to step 550 where apparatus 20 performs an initialization process in order to enable communication with external device 40 via digital data bus 30. According to an exemplary embodiment, processor 14 executes software code (e.g., IEEE-1394 software code, etc.) to perform the initialization process at step 550 and thereby receives notification when external device 40 is detected on digital data bus 30.

Next, at step 560, apparatus 20 provides a play command signal to start operation of external device 40 via digital data bus 30 under the control of processor 14, which causes external device 40 to begin playing. According to an exemplary. embodiment, the play command signal provided at step 560 may be an AV/C protocol PLAY command signal although a different signal protocol could also be used. From step 560, process flow advances to step 570 where apparatus 20 continues with normal operation.

It should also be appreciated that the principles of the present invention reflected herein may be combined in any suitable manner. For example, any aspects of the present invention represented In the flowcharts of FIGS. 3 to 5 may be combined according to design choice.

As described herein, the present invention provides a method and apparatus for controlling a device via a digital data bus by using auto-play and/or auto-pause functions. The present invention may be applicable to various apparatuses, either with or without a display device. Accordingly, the phrase "television signal receiver" as used herein may refer to systems or apparatuses including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for operating an apparatus to control an external device via a data bus, said method comprising:
   detecting, via said apparatus, initiation of a disconnection from said external device;
   determining, via said apparatus, if said external device is in a play mode after said initiation of said disconnection from said external device is detected;
   automatically providing a pause command signal from said apparatus to said external device via said data bus if said external device is determined to be in said play mode; and
   disconnecting said apparatus from said external device after providing said pause command signal.

2. The method of claim 1, further comprised of:
   detecting, via said apparatus, an interruption of power to said apparatus;
   detecting, via said apparatus, a restoration of said power to said apparatus;
   determining, via said apparatus, if said external device is selected as an initial input of said apparatus responsive to said restoration of said power; and
   automatically providing a play command signal from said apparatus to said external device via said data bus if said external device is selected as said initial input.

3. The method of claim 2, wherein said data bus includes an IEEE-1394 bus.

4. The method of claim 2, wherein said pause command signal and said play command signal are AV/C protocol signals.

5. The method of claim 1, further comprised of:
   connecting to said external device;
   determining if said external device is in a pause mode after connecting to said external device; and
   automatically providing a play command signal to said external device via said data bus if said external device is in said pause mode.

6. The method of claim 1, wherein said external device is a digital recording/reproduction device.

7. An apparatus, comprising:
   input/output means for connecting said apparatus to an external device via a data bus;
   processing means for detecting initiation of a disconnection from said external device; and
   wherein said input/output means automatically outputs a pause command signal to said external device via said data bus if said apparatus determines that said external device is in a play mode after said initiation of said disconnection from said external device is detected by said processing means.

8. The apparatus of claim 7, wherein:
   said processing means determines if said external device is selected as an initial input of said apparatus responsive to an interruption and restoration of power to said apparatus; and
   said input/output means automatically outputs a play command signal to said external device via said data bus after said restoration of said power to said apparatus if said external device is selected as said initial input of said apparatus.

9. The apparatus of claim 8, wherein said data bus includes an IEEE-1394 bus.

10. The apparatus of claim 8, wherein said pause command signal and said play command signal are AV/C protocol signals.

11. The apparatus of claim 7, wherein said apparatus connects to said external device via said data bus, and said input/output means automatically outputs a play command signal to said external device via said data bus if said apparatus determines that said external device is in a pause mode after connecting to said apparatus.

12. The apparatus of claim 7, wherein said external device is a digital recording/reproduction device.

13. A television signal receiver, comprising:
   an input/output terminal operative to connect said television signal receiver to an external device via a data bus;
   a processor operative to detect initiation of a disconnection from said external device; and
   wherein said input/output terminal automatically outputs a pause command signal to said external device via said data bus if said television signal receiver determines that said external device is in a play mode after said initiation of said disconnection from said external device is detected by said processor.

14. The television signal receiver of claim 13, wherein:
   said processor determines if said external device is selected as an initial input of said television signal receiver responsive to an interruption and restoration of power to said television signal receiver; and
   said input/output terminal automatically outputs a play command signal to said external device via said data bus after said restoration of said power to said television signal receiver if said external device is selected as said initial input of said television signal receiver.

15. The television signal receiver of claim 14, wherein said data bus includes an IEEE-1394 bus.

16. The television signal receiver of claim 14, wherein said pause command signal and said play command signal are AV/C protocol signals.

17. The television signal receiver of claim 13, wherein said television signal receiver connects to said external device via said data bus, and said input/output terminal automatically outputs a play command signal to said external device via said data bus if said television signal receiver determines that said external device is in a pause mode after connecting to said television signal receiver.

18. The television signal receiver of claim 13, wherein said external device is a digital recording/reproduction device.

* * * * *